March 29, 1966  R. HÜBNER  3,242,715
APPARATUS FOR TESTING PORTABLE GAS-DETECTING INSTRUMENTS
Filed Nov. 18, 1964  3 Sheets-Sheet 1

Rolf Hübner
INVENTOR.

BY Karl G. Ross
AGENT

March 29, 1966　　　R. HÜBNER　　　3,242,715
APPARATUS FOR TESTING PORTABLE GAS-DETECTING INSTRUMENTS
Filed Nov. 18, 1964　　　3 Sheets-Sheet 2

Rolf Hübner
INVENTOR.

BY　Karl G. Ross
AGENT

March 29, 1966   R. HÜBNER   3,242,715
APPARATUS FOR TESTING PORTABLE GAS-DETECTING INSTRUMENTS
Filed Nov. 18, 1964   3 Sheets-Sheet 3

Rolf Hübner
INVENTOR.

BY Karl F. Ross
AGENT

United States Patent Office 3,242,715
Patented Mar. 29, 1966

3,242,715
APPARATUS FOR TESTING PORTABLE GAS-DETECTING INSTRUMENTS
Rolf Hübner, Gabelsbergerstr. 31, Dortmund, Germany
Filed Nov. 18, 1964, Ser. No. 412,120
Claims priority, application Germany, Nov. 19, 1963,
H 50,878
11 Claims. (Cl. 73—1)

My present invention relates to an apparatus for storing, charging and testing portable measuring instruments which are utilized for detecting dangerous gases in mines.

Portable measuring instruments for gas detection in mine shafts and tunnels detect and measure the concentrations of such gases as methane, carbon dioxide and carbon monoxide. These gases, alone or in combination, pose potential dangers to mining personnel. Methane or carbon monoxide admixed with air forms a combustible and explosive mixture; carbon dioxide and carbon monoxide, in high concentrations, lead to anoxia and asphyxiation. Obviously, the measuring instruments must be reliable and, therefore, should be repeatedly tested to determine their operational status.

Such instruments require both chemical and electrical tests. The chemical test consists in feeding a standard gas of known composition (e.g. methane, carbon monoxide, carbon dioxide) into the gas analyzer of the instrument and observing the reading of its indicator calibrated for this particular component. The electrical test determines the performance of the battery or other power source of the instrument.

Conventional testing methods suffer from the drawbacks of extended periods of downtime on the testing bench and, when a two-step electrical and chemical examination is employed, the nonsimultaneous test readings which do not simulate the response of the instrument under actual operating conditions.

In addition, trained specialists are needed to test the instruments and evaluate the test results. In many cases, it is desirable that the instruments be checked immediately prior to use by unskilled or semiskilled mining personnel to verify the accuracy of its readings and/or the response of the alarm circuits associated with its indicator system.

It is, therefore, an object of the present invention to provide an apparatus for storing, effectively testing and, if desired, concurrently charging one or more portable measuring instruments of the type used in mine-gas detection.

It is another object to provide a combined electrical and chemical testing unit adapted to perform an integrated test program under simulated operating conditions such as would be encountered in mine shafts and tunnels.

It is a further object of my invention to provide an apparatus which performs testing of a gas detection instrument in a simple and rapid manner, thus allowing its operation by untrained personnel in minimum time.

It is still another object to provide a storage and testing apparatus accommodating a large number of such measuring instruments emplaced thereon in a state of readiness and enabling rapid verification of the calibration of each instrument.

An apparatus according to my invention comprises a supporting rack or console which accepts a plurality of gas-measuring instruments. Each instrument is inserted into a modular cutout on a front wall of the support and thereby engages an electrical connector and a pneumatic fitting which are respectively aligned with a mating connector and a complementary fitting on the housing of the instrument.

The console accommodates one or more compressed-gas cylinders whose output is used as a reference for calibration of the measuring instrument. Electrically operated valves regulate the flow of gas to an instrument under test. A suitable power source in the console provides operating and/or charging voltage for each instrument under test.

The above and other objects, features and advantages of the present invention will become more readily apparent from the following detailed description, reference being made to the accompanying drawing in which.

Figure 1:
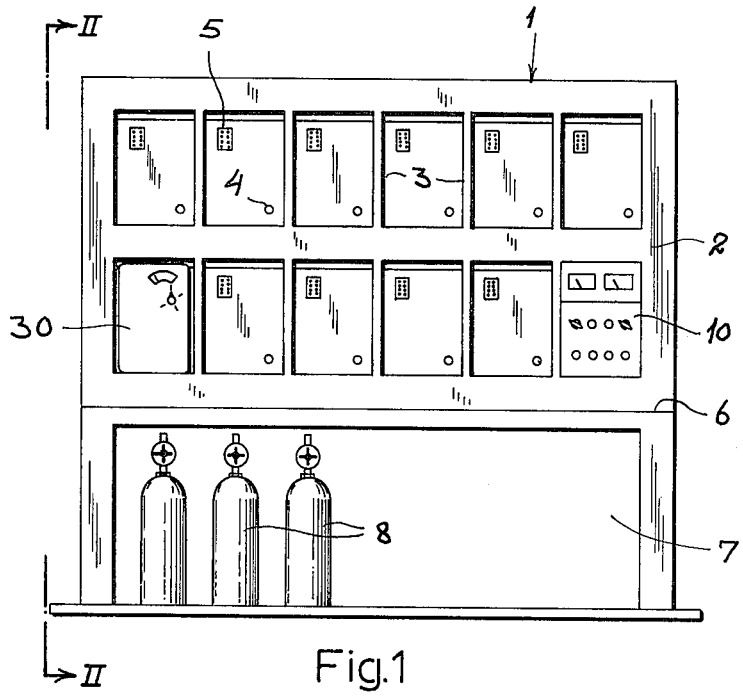
FIG. 1 is a frontal view of an apparatus according to the invention.

As shown in FIG. 1, a console or rack 1 forms a number of compartments 3 each removably accommodating a gas measuring instrument 30 to be tested (only one shown). The compartments 3a etc. are modular recesses in a sloping front wall 2 of the rack 1 (see FIG. 2). Within each recess 3, a female half or socket coupling 4 and a jack 5 constitute, respectively, a test gas inlet and an electrical connection to the associated instrument 30.

A table 6 disposed below and in front of the wall 2 provides a work area and serves for temporary storage of instruments which have been or are about to be tested. A space 7 beneath the table 6 allows the emplacement therein of pressurized cylinders 8 containing diverse test gases. The interior of the rack 1 houses an electrical chassis 9 which includes various circuit components and other elements described hereafter in conjunction with FIG. 5.

A portion of the wall 2 is occupied by a control panel 10 carrying switches, alarm devices and indicators for the testing of an instrument.

Figure 2:
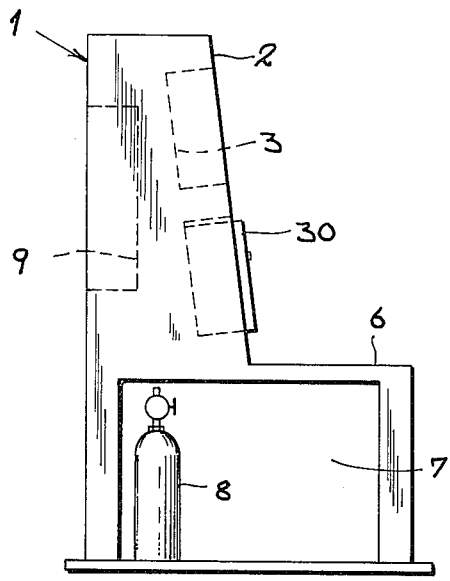
FIG. 2 is a side view taken on the line II—II of FIG. 1.
Figure 3:
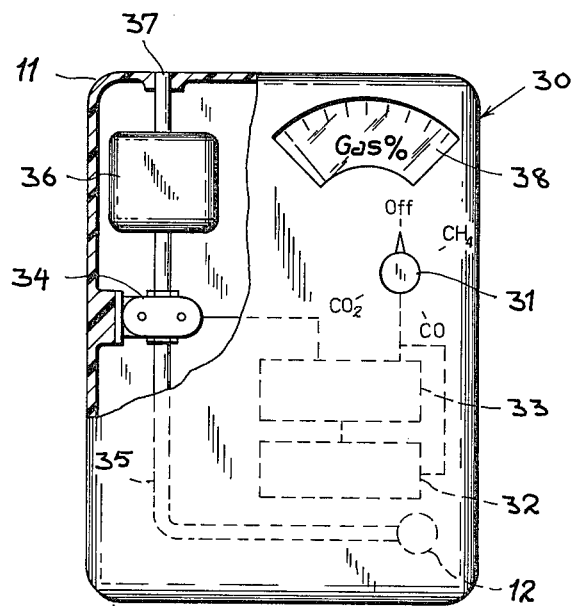
FIGS. 3 and 4 are a front and a rear view, respectively, of a gas-measuring instrument receivable in the apparatus of FIGS. 1 and 2.
Figure 4:
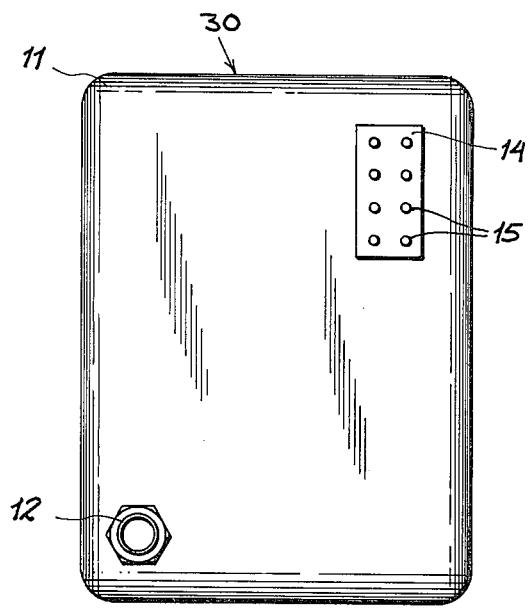

Details of a typical gas measuring instrument 30, adapted to be tested in the apparatus of FIGS. 1 and 2, are shown in FIGS. 3 and 4. The instrument 30 has a housing 11 fitting closely in any one of the recesses 3 of the rack 1. A gas inlet 12, normally used for the aspiration of a sample of the ambient atmosphere in a mine, is matingly receivable in the socket 4 of the recess 3. An electrical connector or plug 14, provided with the requisite number of terminal pins 15 for the various circuit elements, is also disposed on the housing 11 for mating engagement with the jack 5 in the recess 3.

Disposed within the instrument housing 11 are a selector switch 31, a battery 32, a timing circuit 33, a pump 34, a supply duct 35 extending from inlet 12 to an outlet 37, and a measuring chamber 36 forming part of a gas analyzer connected to a visual indicator 38. In operation, the switch 31 is set to a position corresponding to a gas whose presence and concentration is to be determined. The switch 31 is operable to energize the pump 34 with current from the battery 32 under the control of the timing circuit 33 which deactivates the pump 34 after the measuring chamber 36 has been filled with the aspirated gas. The analyzer may function in a variety of ways known per se, e.g. by determining the thermal conductivity of the gas in the chamber.

Figure 5:
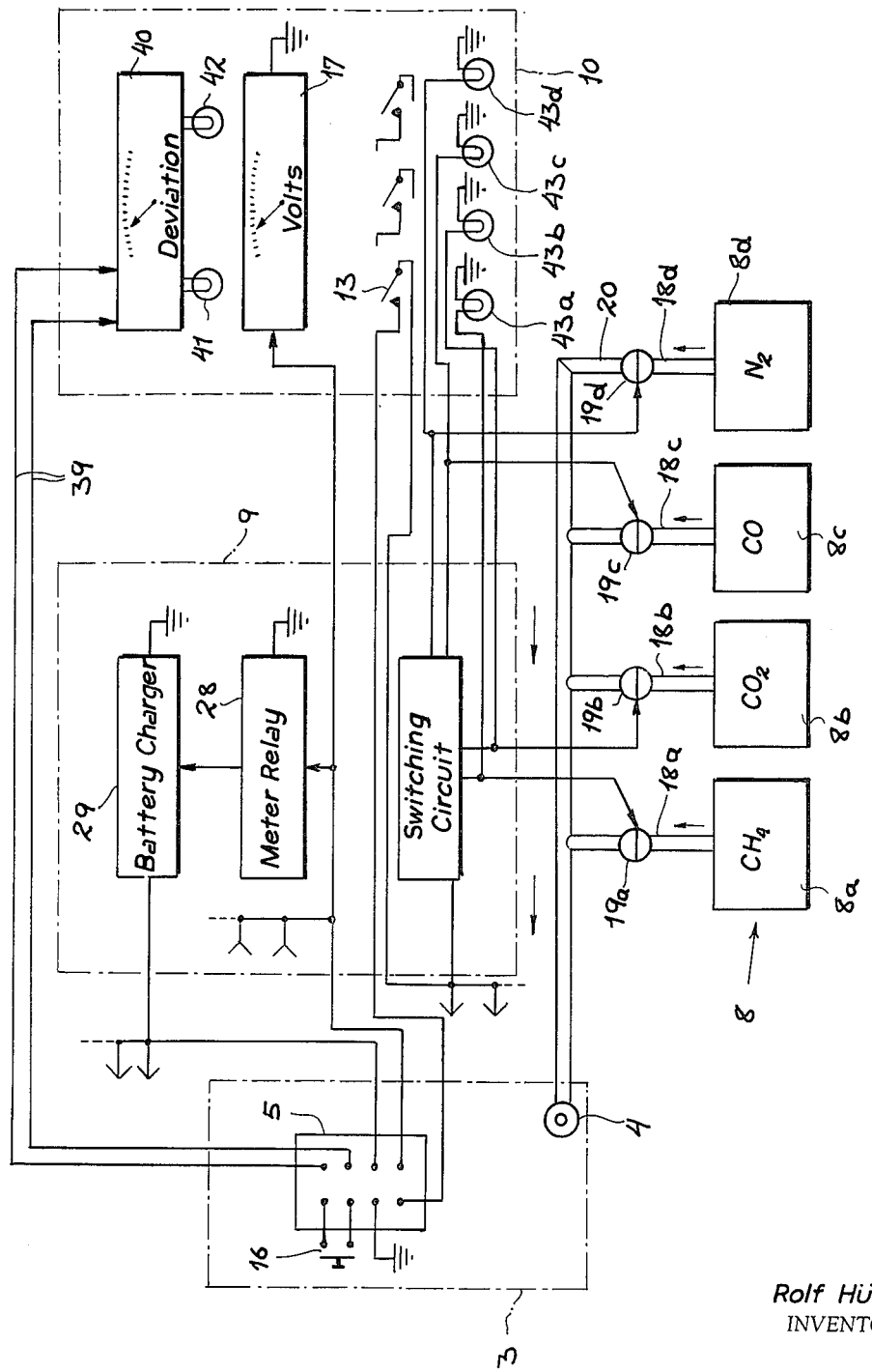
FIG. 5 is a circuit diagram illustrating the operation of the apparatus.

In FIG. 5 I have shown further details of one of the receiving compartments 3, the chassis 9 and the control panel 10. This figure also shows the storage cylinders 8 as including, by way of example, a first cylinder 8a containing compressed methane, a second cylinder 8b containing compressed carbon dioxide, a third cylinder 8c containing compressed carbon monoxide, and a fourth cylinder 8d containing compressed nitrogen as an inert flushing gas. These cylinders are connected via respective conduits 18, 18b, 18c and 18d to a common duct 20 terminating at the socket 4, the latter being advantageously designed in known manner to block the escape of gas in the absence of a complementary fitting 12 inserted therein. The individual supply conduits 18a, 18b, 18c and 18d are normally closed by respective solenoid valves 19a, 19b, 19c and 19d under the control of a switching circuit 27.

A normally open pushbutton switch 16 within recess 3 closes upon the insertion of an instrument 30 into that recess. Switch 16 thereupon short circuits the selector switch 31 of the instrument and extends the input of its timer 33 (FIG. 3) to the switching circuit 27 by way of a normally open manual switch 13, on control panel 10, individually associated with this particular compartment 3. Closure of switch 16 further connects the power source 32 (FIG. 3) of the instrument across an indicator 17 of control panel 10, designed as a voltmeter, and, in parallel therewith, to a meter relay 28 which cuts in a battery charger 29 if the voltage of source 32 is found to be below a predetermined minimum value. Meter relay 28 deactivates the charger 29 as soon as the terminal voltage of the instrument battery 33 has risen above its upper cutoff value, this terminal voltage being readable on the indicator 17. The switching circuit 27 may include a separate current source (which, if desired, could also be the power supply of charger 29) for testing the gas analyzing operation of the instrument even while its own battery is being charged; alternately, the test of the analyzer must be deferred until the completion of the charging process.

To determine the performance of the gas analyzer, the operator closes the control switch 13 for the respective compartment 3 on control panel 10. Switch circuit 27 now steps the timer 33 of the instrument through a testing cycle which may include repeated operation of pump 34 (FIG. 3) to admit the gases from tanks 8a, 8b, 8c successively into the analyzing passage 35–37, the respective solenoid valve 19a, 19b or 19c being concurrently opened for this purpose to a predetermined throttling position. The operator will them determine whether the indicator 38 displays the correct reading as called for by the known concentration of the particular test gas. After each test, and prior to the introduction of a different gas, the switching circuit 27 may briefly open the valve 19d to pass a flow of scavenging gas from tank 8d through the measuring chamber 36.

Naturally, the valves 19a, 19b, 19c and 19d could also be adapted for manual operation, independently of circuit 27, if it were desired to alter the sequence, to admit only one test gas (e.g. methane from tank 8a) into the measuring chamber of the instrument or to supply to that chamber a selected combination of gases simulating a particular atmosphere.

A circuit 39 connects a monitoring indicator 40 on control panel 10 in parallel with the gas concentration indicator 38 of the instrument so as to give the operator a ready visual image of its output. Monitor 40 is shown to work into two alarm lamps 41, 42 which respectively light up whenever the reading of the indicator deviates from the theoretical value so as to lie either below or above a predetermined tolerance range. Additional lamps 43a, 43b, 43c, 43d on panel 10 are connected in parallel with solenoid valves 19a–19d, respectively, to indicate the type of gas being admitted into the measuring chamber. The nitrogen container 8d is representative of a variety of scavenging systems adapted to flush the analyzer passage 35–37 with air or some inert gas. Similarly, the lamps 41, 42 may be replaced by other alarm devices, visual or aural, designed to signify failure of the measuring instrument under test. Furthermore, the distributors 27, 18a–18d, 19a–19d of FIG. 5 could be modified so that, for example, some of the compartments 3 receive only the gas from cylinder 8a, others receive only the gas from cylinder 8b, and so on. These and other modifications, readily apparent to persons skilled in the art, are intended to be embraced within the spirit and scope of the present invention as defined in the appended claims.

I claim:

1. An apparatus for testing portable gas measuring instruments of the type having a passage adapted to receive a sample of the surrounding atmosphere and further having an electrical power supply for the operation of gas analyzing means, said apparatus comprising at least one instrument-receiving compartment with a pneumatic coupling connectable with said passage and an electric coupling connectable with said power supply through mating couplings on an instrument to be tested upon insertion of said instrument in said compartment; a source of test gas connectable to said pneumatic coupling; a source of charging current connectable to said electrical coupling; switch means for connecting said sources to the respective couplings; and meter means connected to said electric coupling for determining the state of charge of said power supply.

2. An apparatus as defined in claim 1, further comprising monitoring means for the output of said gas analyzing means and circuit means for connecting said monitoring means to said electric coupling at least during the admission of test gas to said passage through said pneumatic coupling.

3. An apparatus as defined in claim 2 wherein said monitoring means includes alarm means indicative of a major deviation of said output from a predetermined value.

4. An apparatus as defined in claim 1 wherein said source of test gas comprises a plurality of containers for different gases, said containers being selectively connectable to said pneumatic coupling by said switch means.

5. An apparatus as defined in claim 4, further comprising indicator means operable by said switch means for registering the identity of the container connected to said pneumatic coupling.

6. An apparatus as defined in claim 4, further comprising scavenging means operable by said switch means for admitting a flushing gas to said passage through said pneumatic coupling.

7. An apparatus as defined in claim 4, further comprising automatic distributor means for sequentially connecting said containers to said pneumatic coupling.

8. An apparatus for testing portable gas measuring instruments of the type having a passage adapted to receive a sample of the surrounding atmosphere and further having an electrical power supply for the operation of gas analyzing means, said apparatus comprising at least one instrument-receiving compartment with a pneumatic coupling connectable with said passage and an electric coupling connectable with said power supply through mating couplings on an instrument to be tested upon insertion of said instrument in said compartment; a source of test gas connectable to said pneumatic coupling; voltage-source means connectable to said electric coupling; switch means for connecting said sources to the respective couplings; and indicator means energizable by said voltage-source means for checking the operation of said gas-analyzer means in response to said test gas.

9. An apparatus as defined in claim 8, further comprising charging means connectable across said power supply via said electric coupling, said voltage-source means forming part of said charging means.

10. An apparatus for testing portable gas measuring instruments of the type having a passage adapted to receive a sample of the surrounding atmosphere and further having an electrical power supply for the operation of a gas analyzing means, said apparatus comprising a plurality of instrument-receiving compartments each with a pneumatic coupling connectable with said passage and an electric coupling connectable with said power supply through mating couplings on an instrument to be tested upon insertion of said instrument in said compartment; a source of test gas connectable to said pneumatic coupling; a source of charging current connectable to said electric coupling; switch means for selectively connecting said sources to the respective couplings of any one of said compartments; and meter means connected to said electric coupling for determining the state of charge of said power supply.

11. An apparatus for testing portable gas measuring instruments of the type having a passage adapted to receive a sample of the surrounding atmosphere and further having an electrical power supply for the operation of gas analyzing means, said apparatus comprising a plurality of instrument-receiving compartments each with a pneumatic coupling connectable with said passage and an electric coupling connectable with said power supply through mating couplings on an instrument to be tested upon insertion of said instrument in said compartment; a source of test gas connectable to said pneumatic coupling; voltage-source means connectable to said electric conpling; switch means for selectively connecting said sources to the respective couplings of any one of said compartments; and indicator means energizable by said voltage-source means for checking the operation of said gas analyzer means in response to said test gas.

References Cited by the Examiner
UNITED STATES PATENTS 1,890,884 12/1932 Peter _____ 73—1
3,070,988 1/1963 Kapff _____ 73—1

LOUIS R. PRINCE, *Primary Examiner.*